US009378238B2

(12) United States Patent
Gonsalves et al.

(10) Patent No.: US 9,378,238 B2
(45) Date of Patent: Jun. 28, 2016

(54) METHOD AND SYSTEM FOR COLLECTION OF DEVICE LOGS DURING A REMOTE CONTROL SESSION

(71) Applicant: AetherPal Inc., South Plainfield, NJ (US)

(72) Inventors: Deepak Gonsalves, Bridgewater, NJ (US); Subramanyam Ayyalasomayajula, Kendall Park, NJ (US); Ranjith Kumar Palanichamy, Edison, NJ (US)

(73) Assignee: AetherPal, Inc., South Plainfield, NJ (US)

( * ) Notice: Subject to any disclaimer, the term of this patent is extended or adjusted under 35 U.S.C. 154(b) by 287 days.

(21) Appl. No.: 14/039,687

(22) Filed: Sep. 27, 2013

(65) Prior Publication Data

US 2014/0089354 A1    Mar. 27, 2014

Related U.S. Application Data

(60) Provisional application No. 61/706,167, filed on Sep. 27, 2012.

(51) Int. Cl.
*G06F 7/00* (2006.01)
*G06F 17/30* (2006.01)
*H04M 3/42* (2006.01)
*H04M 3/22* (2006.01)

(52) U.S. Cl.
CPC ....... *G06F 17/30368* (2013.01); *H04M 3/2218* (2013.01); *H04M 3/42* (2013.01)

(58) Field of Classification Search
None
See application file for complete search history.

(56) References Cited

U.S. PATENT DOCUMENTS

| | | | |
|---|---|---|---|
| 6,839,717 B1 * | 1/2005 | Motoyama | H04L 41/0853 707/812 |
| 2004/0059205 A1 * | 3/2004 | Carlson | A61B 5/0006 600/310 |
| 2007/0011334 A1 | 1/2007 | Higgins et al. | |
| 2007/0207800 A1 * | 9/2007 | Daley | H04L 12/2602 455/425 |
| 2007/0282999 A1 * | 12/2007 | Tu | G06F 11/26 709/224 |
| 2011/0066891 A1 * | 3/2011 | Wechsler | G06F 17/30008 714/37 |
| 2011/0201324 A1 | 8/2011 | Persson et al. | |
| 2012/0005542 A1 * | 1/2012 | Petersen | G06F 11/0709 714/48 |
| 2012/0182939 A1 | 7/2012 | Rajan et al. | |
| 2013/0065569 A1 | 3/2013 | Leipzig et al. | |

* cited by examiner

*Primary Examiner* — Uyen Le
(74) *Attorney, Agent, or Firm* — Volpe and Koenig, P.C.

(57) ABSTRACT

Described herein are a method and system that has the capability to interface with a remote control system and utilize systems within wireless devices to activate a debug logger and view and analyze the collected data logs. A wide range of measurements and analytical with respect to applications, device hardware, device software and network in various simulated and natural environments is obtained, and transmitted to the remote system for analysis and storage.

21 Claims, 9 Drawing Sheets

METHOD AND SYSTEM FOR COLLECTION OF DEVICE LOGS DURING A REMOTE CONTROL SESSION

CROSS REFERENCE TO RELATED APPLICATIONS

This application claims the benefit of U.S. provisional application No. 61/706,167, filed Sep. 27, 2012, the contents of which are hereby incorporated by reference herein.

FIELD OF INVENTION

This application is related to wireless communication devices, systems, networks and methods of operation.

BACKGROUND

A log file or simply log is a file that records events taking place in the execution of a system in order to provide an audit trail that can be used to understand the activity of the system and to diagnose problems. The act of keeping a log file is called logging.

Logs are essential to understand the activities of complex systems like wireless communication devices, particularly in the case of applications with little user interaction. It may be useful to combine log file entries from multiple sources like network, radio, events and applications. Statistical analysis of these files may yield correlations between seemingly unrelated events which in turn help device manufacturers and network operators improve their product quality and performance.

SUMMARY

Described herein are a method and system that has the capability to interface with a remote control system and utilize software within wireless devices to activate a debug logger and view and analyze the collected data logs. The general purpose is to have a wide range of measurements with respect to applications, device hardware, device software and network in various simulated and natural environments.

The system has the ability to automatically collect data on a 24 hour basis on both test and customer devices. Upon activation, the logging client is deployed and may be left unattended on the wireless device to measure and record information for the duration of the monitoring period. This allows for a comprehensive and accurate picture of the conditions being monitored and the performance of the wireless device in these conditions.

The data collected in the log files could be used for improving the quality of the network, the software and applications residing inside the wireless device. It could also be used to communicate and notify an administrator in case of alarm events to take immediate action.

The system provides a centralized log service to report all the events that have taken place. It also allows the filtering and recording of log messages to be performed by a separate dedicated subsystem, rather than placing the onus on each application or source to provide its own ad-hoc logging system. The system defines five log sources, namely, system (main), event, radio, global positioning system (GPS) and network. The invention covers log collection, centralized aggregation, long term retention, log analysis in real time and log analysis in bulk after storage as well as log search and reporting.

DETAILED DESCRIPTION

It is to be understood that the figures and descriptions of embodiments have been simplified to illustrate elements that are relevant for a clear understanding, while eliminating, for the purpose of clarity, many other elements. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein.

Described herein is a method and system that provides a mechanism for collecting wireless device debug output and viewing them in real time on a console user interface and saving the information to a file system. Logs from various applications and portions of the wireless device are collected in a series of native buffers, which can then be viewed and filtered by the file reader of the logging system.

The wireless device generally maintains multiple buffers for log messages. Some examples of these buffers are the radio buffer (which is the radio signal of the mobile device which allows you to make phone calls and send messages), events buffer and the system or main buffer. The logging system collects these log messages on a periodic basis or at real time, processes these log messages, formats them into a readable output and then writes the log messages to a server console or database which can be viewed by a remote technician. It also provides the remote technician with an environment where the log messages can be filtered based on its severity and a multitude of attributes. The log messages can be viewed in various different formats and can be saved to a file system. Apart from collecting and presenting device generated log messages, the logging system captures all networks and global positioning system (GPS) related events that occur on the wireless device and presents them to the remote technician. The logging system also has the ability to set alarms to notify the remote technician in case of catastrophic events or errors on the device. The remote technical may also be provided with the ability to specify the time period during which the logs need to be retrieved and whether or not the wireless device needs to be in remote connection with the server during the logging. The logging system also allows for markers to be set on the log messages to help with indexing and easy reading of high volume logs.

Figure 1:
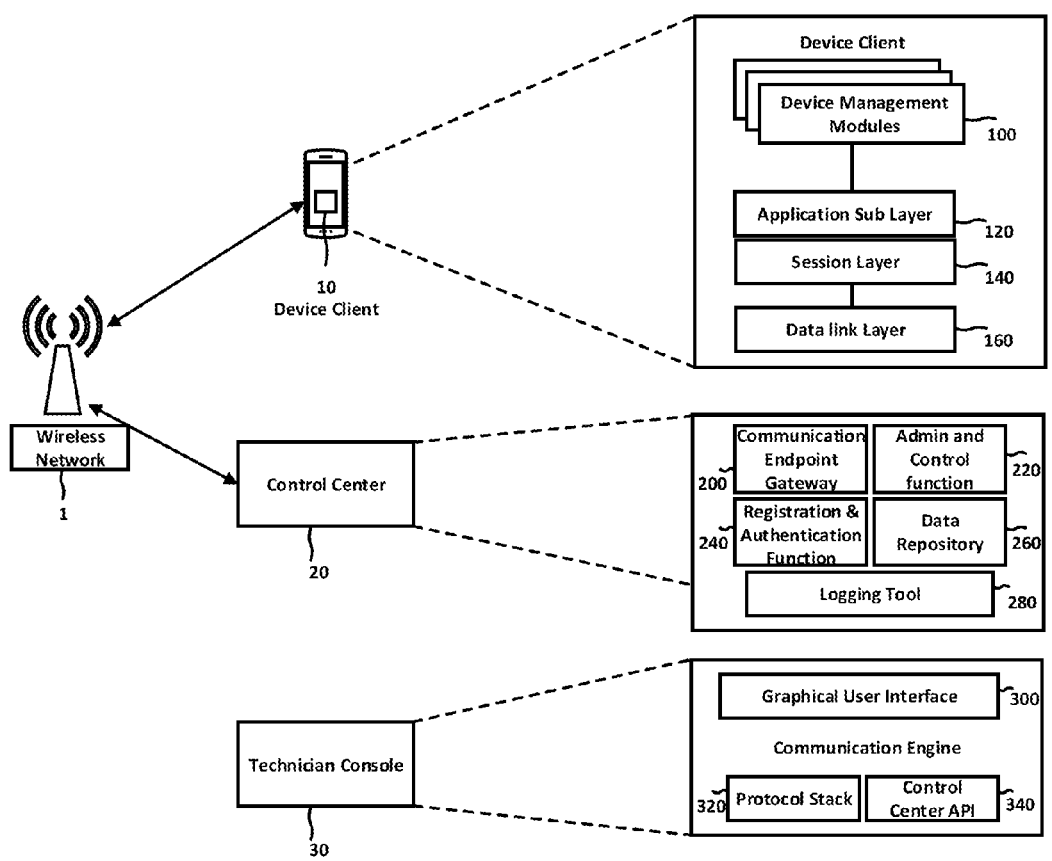
FIG. 1 shows an example architecture of a remote control system used for collection of device logs from a wireless device.

FIG. 1 is an example overall architecture of a remote logging system which comprises at least a device client residing inside a device (collectively device client and client are referred to as device 10 or device client 10, as applicable), a control center system 20 and a technician console 30. The device 10 communicates with the control center 20 through a wireless network 1, for example. For purposes of readability, block numbers starting with: 1xx relate to the device 10 and its components; 2xx relate to the control center system 20 and its components; and 3xx relate to the technician console 30 and its components.

The control center system 20 is responsible for data management, device management, web services, analytics, security management, administrative services and device connectivity. The components of the control center system 20 includes a communication end point gateway (CEG) 200, an admin and control function or entity 220, a registration and authentication function module or entity 240, a data repository 260 and a logging tool 280. The gateways, modules and/or entities are implemented as or in processors, servers and/or any computing device or system.

The CEG 200 manages the device connections within the system. In particular, the CEG 200 provides communication endpoints between the admin and control function module or entity 220 and the device 10, allows for multiple requests to be serviced within one session from multiple consoles, provides a consistent manner of device connection and tool service in a system with heterogeneous devices running different operating systems, and provides load balancing across multiple connection handlers (as described herein below) on each CEG 200 in order to minimize single point of failure.

Figure 2:
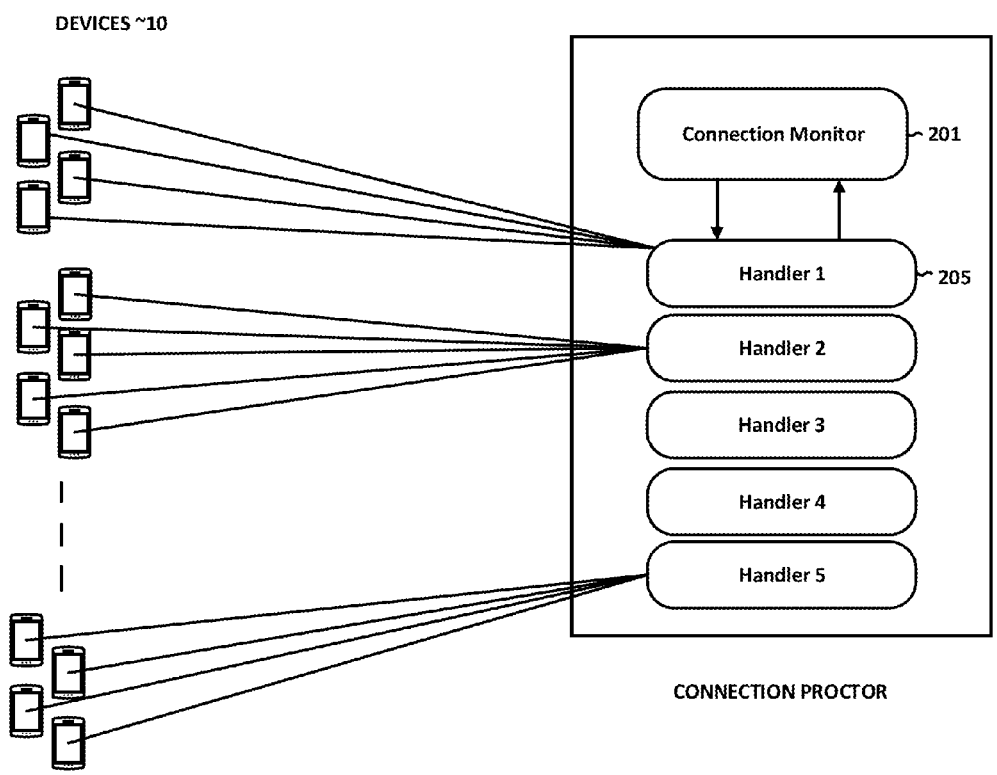
FIG. 2 shows an example structure of a communication end point gateway or connection proctor.

FIG. 2 shows an example CEG or connection proctor which includes at least a connection monitor 201 and connection handlers 205. The connection monitor 201 creates and manages connection handlers 205, creates session IDs for new connection requests and monitors all the scheduled and existing sessions. By default, a connection handler 205 is setup for every CEG, where the number of connection handlers 205 is configurable. All the sessions are load distributed across the connection handlers 205. Each connection handler 205 handles multiple device sessions.

Referring back to FIG. 1, the admin and control function or entity 220 administers and manages all types of communication between the control center 20 and the client devices. For example, the admin and control function or entity 220 may include an administrative service that acts as the central administration entity of the system. Through this service, system administrators perform administration, management and instrumentation of all the servers within the system, create and maintain multiple tenants, assign tenant administrator roles, and other like functions. In another example, the admin and control function or entity 220 may have a management service which provides the operational end point to the system and performs load distribution among the CEG, management of device registration, administration of devices and session queuing. A management entity may be included which is responsible for providing the management service with in-memory data storage for key operational data user/group/zone structures, and the like. In another example, the admin and control function or entity 220 may have a service coordinator which is responsible for coordinating the communication between various elements within the system. It provides the database interface to the registration and authentication function 240. All services register themselves with the service coordinator. The service coordinator is responsible for service discovery.

The data repository 260 stores all the information about the devices 10, server configuration, tasks and status settings. These databases are pivotal to configure and update managed devices and server components. It is also responsible for maintaining the device authentication information. The data repository 260 may comprise three database (DB) elements: an admin DB, operations (Ops) DB, and a reports DB. The admin DB maintains all the system configurations, tenant configuration and management information, system administration and server instrumentation data. This database is accessed by the administrative service. The Ops DB maintains data that is required for the operations of the system such as device enrollment, groups, users, zones, and the like. This database is accessed by the management service and the service coordinator. The reports DB contain historical data of device enrollment, session, audit, report views, and the like.

The registration and authentication function 240 provides a single point of entry for all devices for enrollment and authentication services during a session. In an example, the registration and authentication function 240 comprises a registration service. In another example, the registration and authentication function 240 includes an enrollment service, which is responsible for enrolling registered devices with the system. In another example, the registration and authentication function 240 includes a software update module which manages the various client packages in the system. Devices connect to the software update module to request client updates. If an update is available, the software update module will provide the appropriate client download link.

The logging tool 280 interfaces with both the technician's console 30 and the device client 10. The logging tool 280 receives instructions from the technician to start the logging process. These instructions might include the time period during which the log messages need to collected, the severity of the log messages and filters that need to be applied to the log message in order to reduce the amount of data received for easy reading. The device client 10 is activated by a short message service (SMS) message which initiates a secure communication channel between the console 20 and device client 10. The logging tool 280 then processes the instructions received from the technician and relays it to the device client 10. The device client 10 initiates the process of recording and capturing log messages based on the instructions received. These instructions might include various sub commands which specify how and when the log messages need to be collected. In an example, only for log messages containing fatal errors might be requested. In another example, log messages with specific tags or process ids might be requested. The logging tool 280 also performs the function of receiving the log messages from the device client 10. Once received, the log messages are formatted into a readable output. The logging tool 280 is responsible for transferring the logs received from the device client 10 onto the remote technicians console and displaying it in the desired structure. The logging tool 280 is also responsible for writing the log messages to a database or a file system when desired.

The device client 10 includes at least device management modules 100, application sub-layer 120, session layer 140 and data link layer 160. These modules are explained in detail in FIG. 3.

Figure 3:
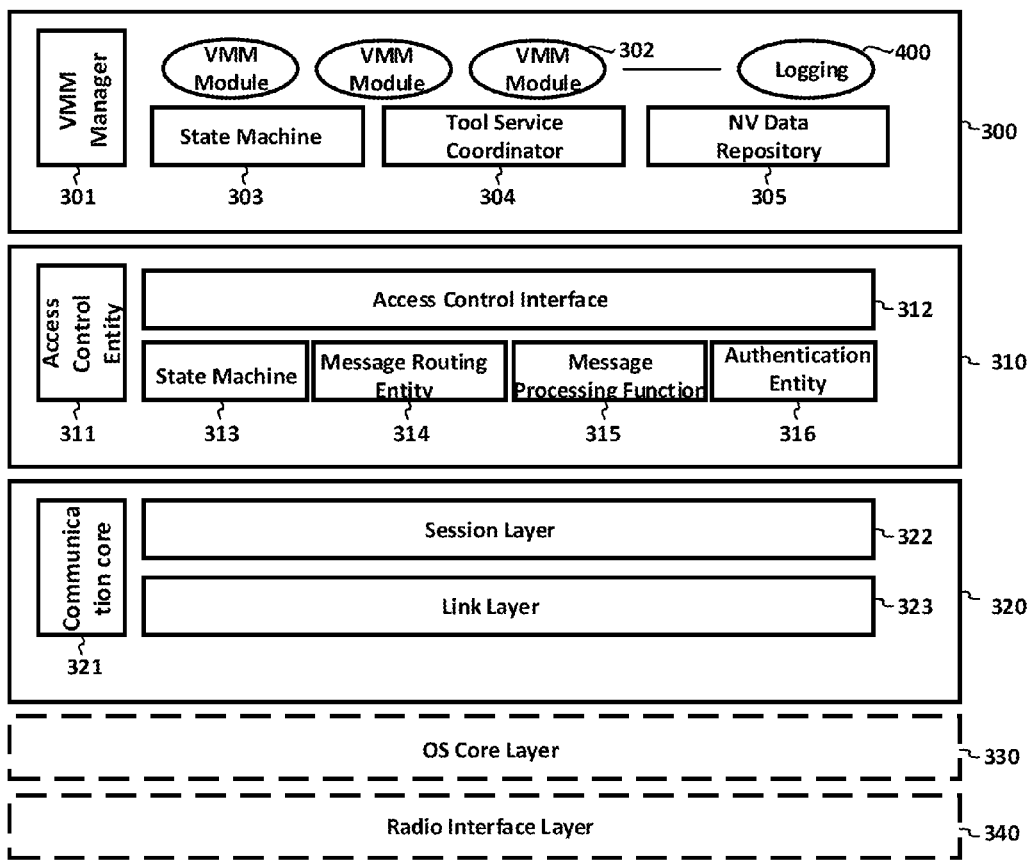
FIG. 3 shows an example architecture of a client software residing on a wireless device.

Referring to FIG. 3, the device client module includes a virtual mobile management (VMM) layer or entity 300, an access control entity 310 and a communication core 320. The VMM entity 300 includes a VMM manager 301, VMM modules 302, a state machine 303, a tool service coordinator 304, and a non-volatile data repository 305.

The VMM modules 302 provide a multitude of tool services. The tool services are grouped together to exhibit common functionality such as remote control and log management. The Logging Module 400 which is one of the VMM modules 302 is described in more detail further in the FIG. 4 and FIG. 5. Each tool service maintains an instance of a state machine 303, which defines a set of shared states that the tool service on the device application shares with the control center 20. The tool service coordinator 304 maintains the lifetime of all tool services, and is responsible in creating and destroying tool services.

The non-volatile data repository 305 stores authentication and authorization specific data that is shared between the VMM application and the control center 20. The non-volatile data repository 305 also serves the purpose of maintaining tool service configuration as well as VMM configuration data.

The access control entity 311 provides a set of functions to the tool services to communicate with the control center 20. The access control entity 311 provides encapsulation of messages before forwarding it to the communication core layer 320. It invokes an instance of the communication core layer 320 and provides a state machine 313 that defines the state of the VMM application.

The access control entity 311 interacts with an access control interface (ACI) 312, which provides a set of standard Application Programmer Interfaces (API) to the tool services. These APIs provide a consistent communication platform to facilitate both synchronous as well as asynchronous communication. The state machine 313 identifies the overall state of the VMM application. State transitions within the state machine 313 trigger events that are handled by the VMM layer 300. The states are open and close and traffic flows through the ACI 312 only in the open state.

An authentication entity 316 is responsible for ensuring that the device 10 receives a connection and processes requests from the control center 20 with which it is enrolled. The authentication entity 316 ensures data integrity, security and authentication.

A message routing entity 314 is responsible for routing all signal messages destined to tool services to the respective event handlers.

A message processing function 315 is a signal message pre-processor and receives signal messages from the session layer 322 destined towards tool services. The message processing entity de-frames these messages prior to forwarding it to the message routing entity 314, which applies the routing rules. Messages that are destined to the control center 20 from tool services are encapsulated in the message processing entity.

The communication core layer 320 setups and maintains a dedicated communication channel with the control center 20. The communication core layer 320 provides the necessary framework to transport messages between the upper layers 300 and 310 and the control center 20. The communication core layer 320 provides message encapsulation, framing, fragmentation and packet re-construction of tool service messages.

Referring back to FIG. 1, the technician console 30 comprises a Graphical User Interface, Communication Engine, Protocol Stack and the Control Center APIs. The technician can use the graphical user interface to initiate the logging process on the device. The technician is also provided with the environment to configure the collection filters. These filters include specifying the log level, log type, process id, tracking id, application name and so on. The technician can also specify the log collection duration and type. The different types of logging are extended logging, periodic logging and offline logging. The log messages received from the device client are parsed and decoded to a readable output. This is then displayed on the graphical user interface and can be viewed by the technician. The log files can also be saved to the database or a remote file system.

Figure 4:
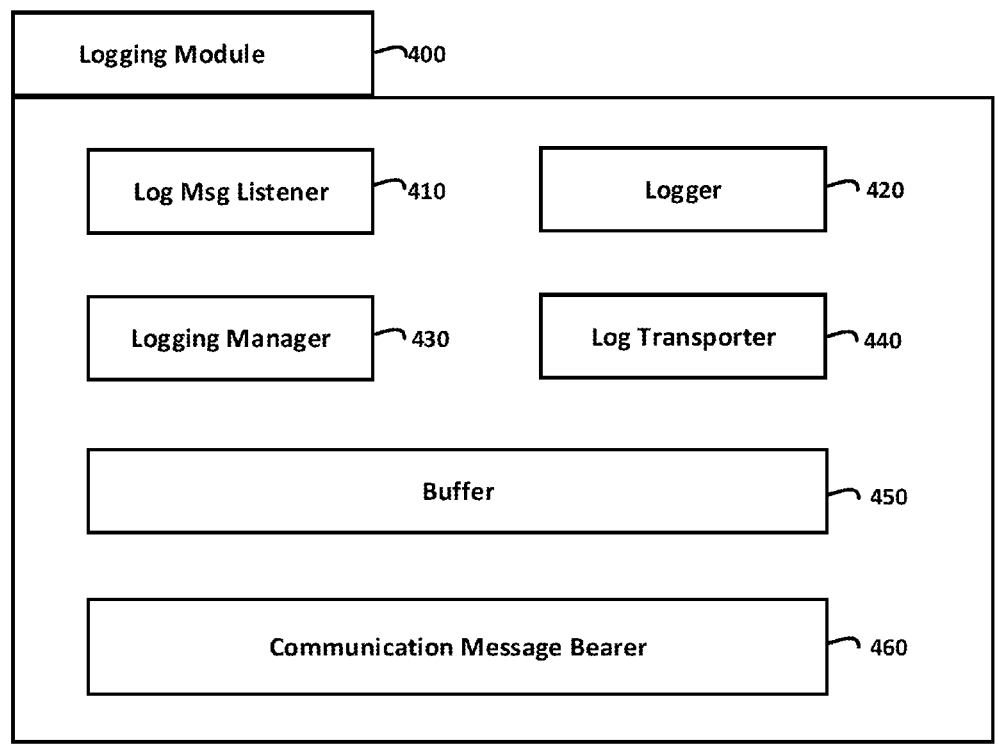
FIG. 4 shows an example structure of a logging module within a device client.

Referring to FIG. 4, a logging module 400 is responsible for pulling the log messages from the device native buffers, recording events related to changes in network and GPS location of the device and relaying the log data back to the control center 20. In an example, the logging module 400 includes a Log Message Listener entity or module 410, Logger entity or module 420, Log Manager entity or module 430, Log Transporter entity or module 440, Buffer entity or module 450 and Communication message bearer entity or module 460. Inside the wireless device operating system, every application runs its own process, each of which runs its own virtual machine. Each virtual machine exposes a unique port that a debugger can attach to. The debugger writes the log messages to a set of native buffers. When the remote technician initiates the logging process, the control center sends a logging command to the device. This logging command includes information about when to start and stop logging, log level, log types and markers, for example. For example, the logging command might be to retrieve all event logs with the log level error and process id x. The Log Message Listener entity or module 410 receives these commands through a bearer channel. The logging command is then parsed and decoded for further action. The Communication message bearer module 460 contains detailed information about each command that might be sent from the control center 20. Some examples of these bearer commands are Start Logging Request, Start Logging Response, Enable Device Info Logging Request, Disable Device Info Logging Request and so on. The decoded command is then sent to the Logger module 420 which starts pulling log messages from the device native buffers and records events related to location and network change. The log messages that are retrieved are stored in the Buffer 450 in case of online logging and into a file system in case of offline logging. The Log Manager 430 is responsible for pulling all the log messages from the Buffer 450 or file system and composing a log post message. Each log post message includes a pre-determined number of log messages. The log post is then transferred to the control center 20 by the Log Transporter 440 over the communication bearer channel.

Figure 5:
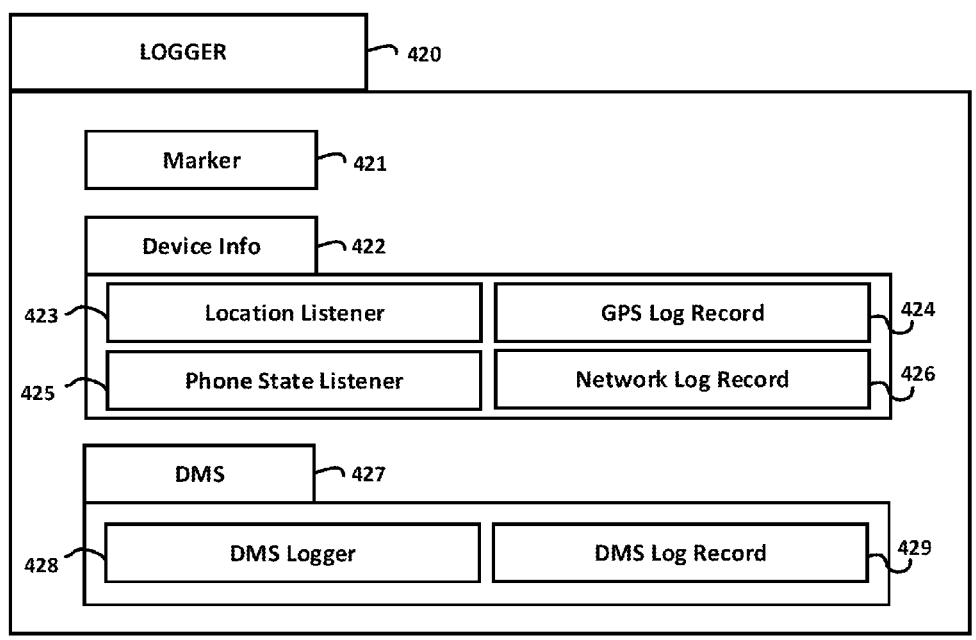
FIG. 5 shows an example structure of a logger.

Referring to FIG. 5, The Logger module 420 includes a Device Info module or entity 422, Debug Monitor module or entity 427 and Marker module or entity 421. The Device info module or entity 422 is responsible for recording events and changes in the device location and network. The Device info module or entity 422 includes a Location listener 423, a GPS log record 424, a Phone State Listener 425 and a Network log record 426. The Location listener 423 tracks any changes in the wireless device location. When the change occurs, the information is sent to the GPS Log record 424 which composes the log message. The log message has the following information—TimeStamp, Latitude, Longitude and Description. The Description contains provider name, location accuracy, altitude, speed and so on. The Phone State listener 425 tracks any changes to the wireless device data network. When a change occurs, the information is sent to the Network Log Record 426 which composes the log message. The log message contains the following information—Timestamp, Latitude, Longitude, Network Event Type, Network Type, Signal Strength and Description. The Description contains active network, network type, state, operator name, operator code, roaming, signal description, network id, base id and so on.

The Debug Monitor function module or entity 427 includes the following components—Device Monitor Service (DMS) Logger 428, and DMS Log Record 429. The DMS Logger 428 is responsible for keeping track of the device native buffers and pulling the log messages from the native buffer every time a new log message is written. This log message is sent to the DMS Log Record function 429 which formats the data into a readable output and appends additional information to the log message. The additional information might include the log level, the log type, log filters, message length and so on. The following are some exemplary log levels that might be available. An example log level may be ERROR, which indicates the system is in distress, customers are probably being affected and the fix probably requires human intervention. Another example log level may be WARN, which indicates an unexpected technical event occurred, customers may be affected but probably no immediate human intervention is required. Another example log level may be INFO, which includes system lifecycle events, session lifecycle events and significant boundary events. Another example log level may be DEBUG, which is used for entry/exit of most non-trivial processing, and marking interesting events and decision points. Another example log level may be ALL, which includes extremely detailed and potentially high volume logs. The Log Type specifies which native buffer the log messages were pulled from and may include System, Event and Radio, for example. The log filters help with filtering the log messages to reduce the volume of data that needs to be transferred and helps the remote technician analyze the data conveniently. Some exemplary filters are timestamp, process id, tracking id, tag, application name, and version. The appended information helps the control center 20 filter and categorize the log messages for convenient viewing.

The log files usually contain a lot of low level data. During wireless device testing, errors and failures could be caused by a lot of known external factors. Marker function 421 provides the remote technician with the ability to specify event start and event end markers inside the log files when these external factors take effect to reduce the amount of data that need to be analyzed by the remote technician.

Figure 6:
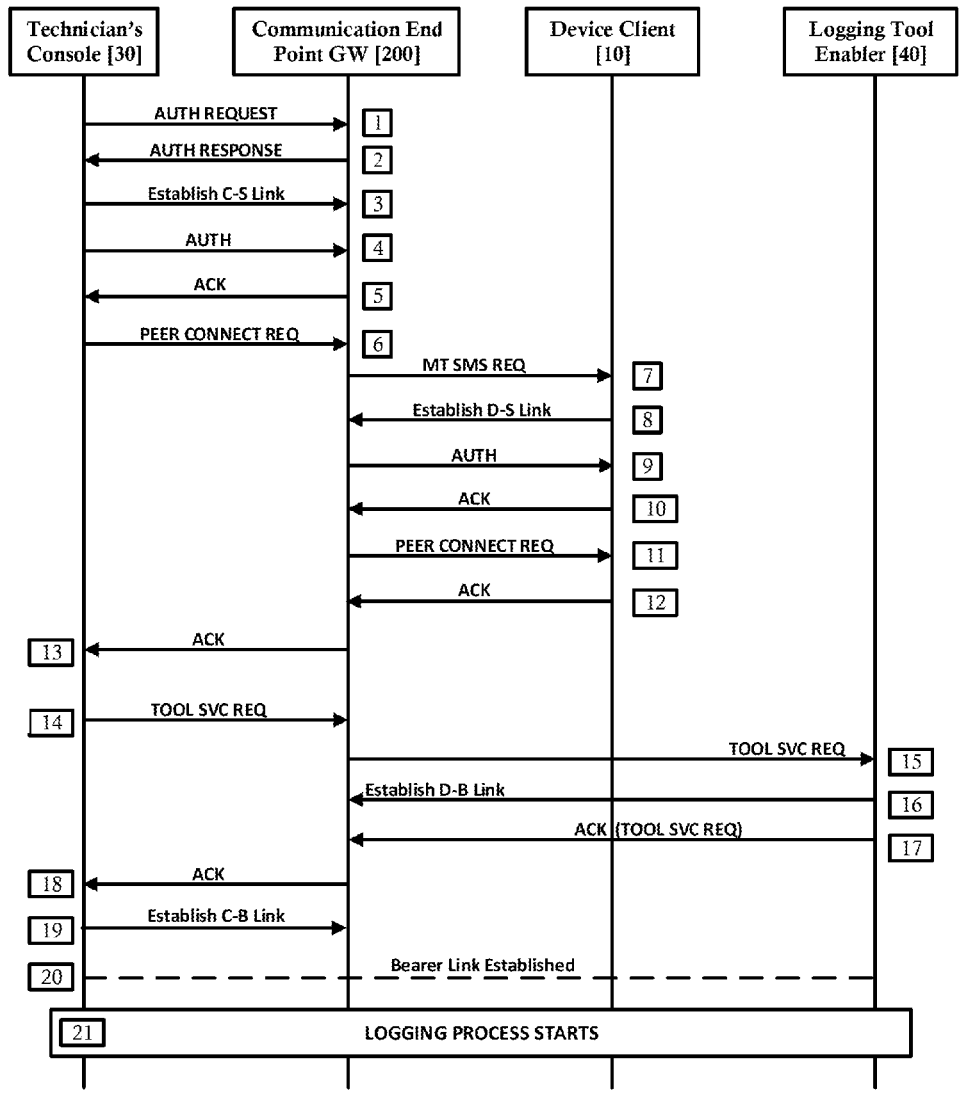
FIG. 6 shows an example process of establishing a remote logging session connection.

FIG. 6 describes an example flow of control during a connection establishment. The CEG 200 receives a Control Signal (C-S) link connection request from Technician Console 30. An Authentication Request is received by CEG 200 from the Technician Console 30 (1) and an Authentication Response is sent by CEG 200 to Technician Console 30 (2). The C-S link is established (3) followed by authentication (4) and acknowledgement (5). A PEER_CONNECT_REQ signal is received by CEG 200 from Technician Console 30 (6). The CEG 200 sends a Mobile Terminated SMS to Device 10 (7). The CEG 200 receives a Data Signal (D-S) link connection request from Device 10 (8). An Authentication Request is received by CEG 200 from Device 10 (9). An Authentication Response (shown as an ACK) is sent by CEG 200 to Device 10 (10). A PEER_CONNECT_REQ signal sent by CEG 200 to Device 10 (11). An acknowledgement (ACK) is received by CEG 200 from Device 10 (12). An ACK is transmitted by CEG 200 to Technician Console 30 (13). A TOOL_S-VC_REQ is received by CEG 200 from Device 30 (14). A TOOL_SVC_REQ is relayed by CEG 200 to Logging Tool 40 (15). The CEG 200 receives a Data Bearer (D-B) link connection from Logging Tool 40 (16). The CEG 200 receives an ACK from Logging Tool 40 for the TOOL_S-VC_REQ (17). An ACK is relayed by CEG 200 to Technician Console 30 (18). The CEG 200 receives Control Bearer (C-B) link connection request from Technician console 30 (19). At this point, the control plane and bearer plane is (are) established (20). The log data is carried over the bearer channels (21).

Figure 7:
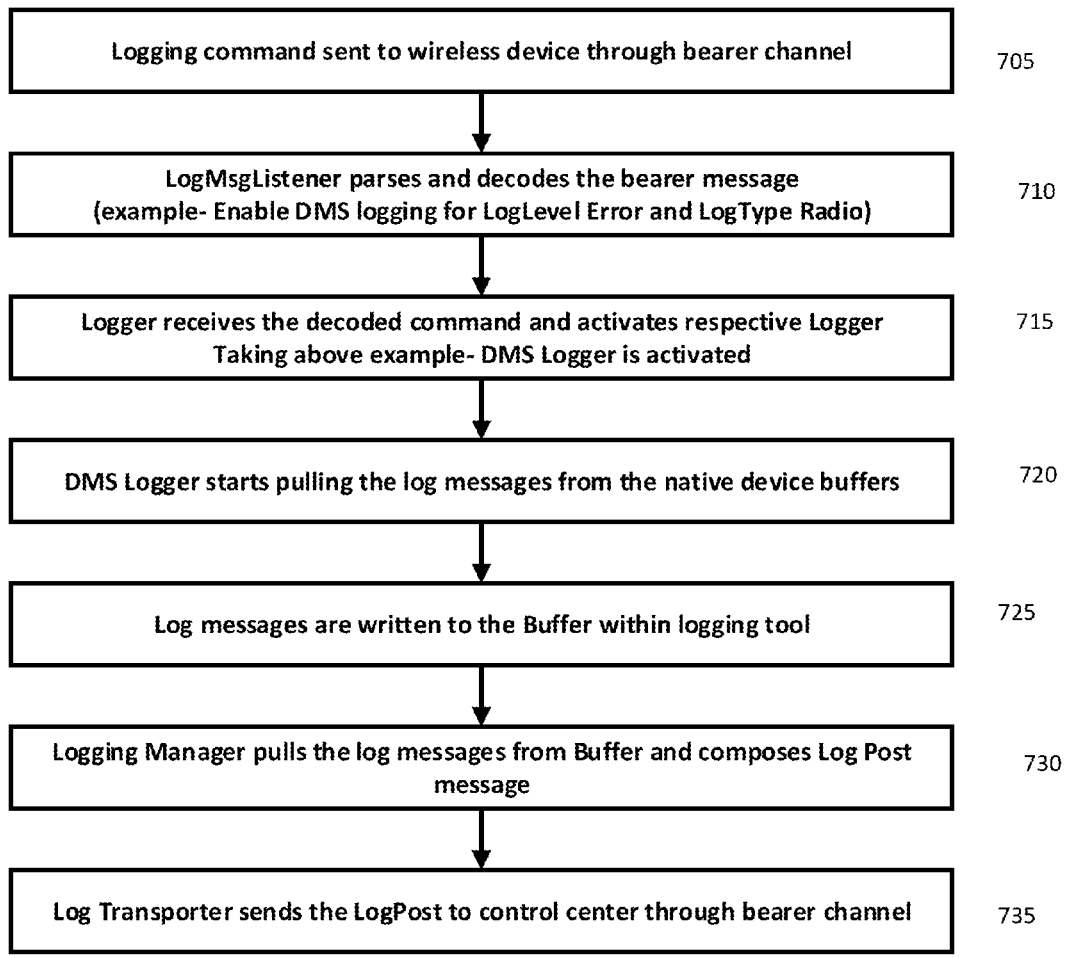
FIG. 7 shows an example flow diagram of an online logging process.

FIG. 7, along with FIG. 5, describes an example logging process when the wireless device is online and is in remote connection with the control center. The command to start the logging process is sent to the wireless device through the bearer channel (705). An example of such command could be an Enable DMS logging for Log Level Error and Log Type Radio. Another example could be Enable Device Info Logger for network events. The Log Msg Listener 410 parses and decodes the bearer message (710). The Logger 420 receives the decoded message and activates the DMS 427 or Device info logger 422 (715). Taking the above mentioned command as an example, the DMS logger 427 would pull the log messages from the device Radio buffer (720). The Device info logger 422 records network related events. All the log messages are written to a Buffer 450 within the logging tool (725). The Log Manager 430 pulls the log messages from the Buffer 450 and composes a log post message (730). The Log Transporter 440 sends the log post message to the control center 20 over the bearer channel (735).

Figure 8:
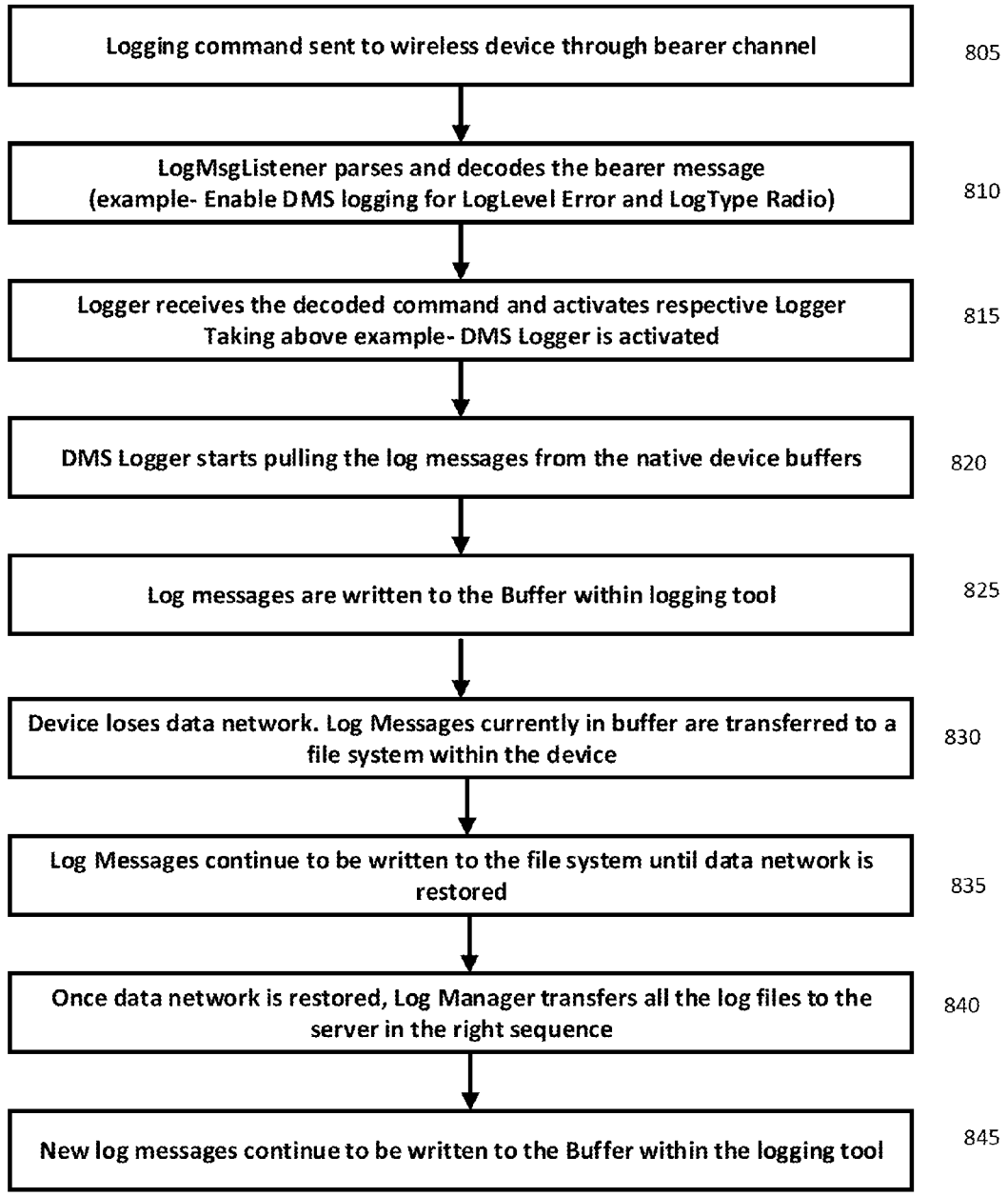
FIG. 8 shows an example flow diagram of an offline logging process.

FIG. 8, along with FIG. 5, describes the logging process when the wireless device is offline or loses data connection. As described above, the command to start the logging process is sent to the wireless device through the bearer channel (805). The Log Msg Listener 410 parses and decodes the bearer message (810). The Logger 420 receives the decoded message and activates the DMS 427 or Device Info Logger 422 (815). The DMS logger 427 pulls the log messages from, for example, the device Radio buffer (820). All the recorded log messages are written to the Buffer 450 with the logging tool (825). During this process, if the bearer channel is broken or the device loses data connection, all the log messages in the buffer 450 are transferred to a file system within the device (830). The Logger 420 continues to write log messages to the file system as long as the device is offline (835). Once the device comes back online, the bearer channel is reestablished (840). All the logs in the file system are transferred to the control center 20 in the correct order. Once all the files have been transferred, the Logger 420 continues writing the log messages into the Buffer 450 (845).

Figure 9:
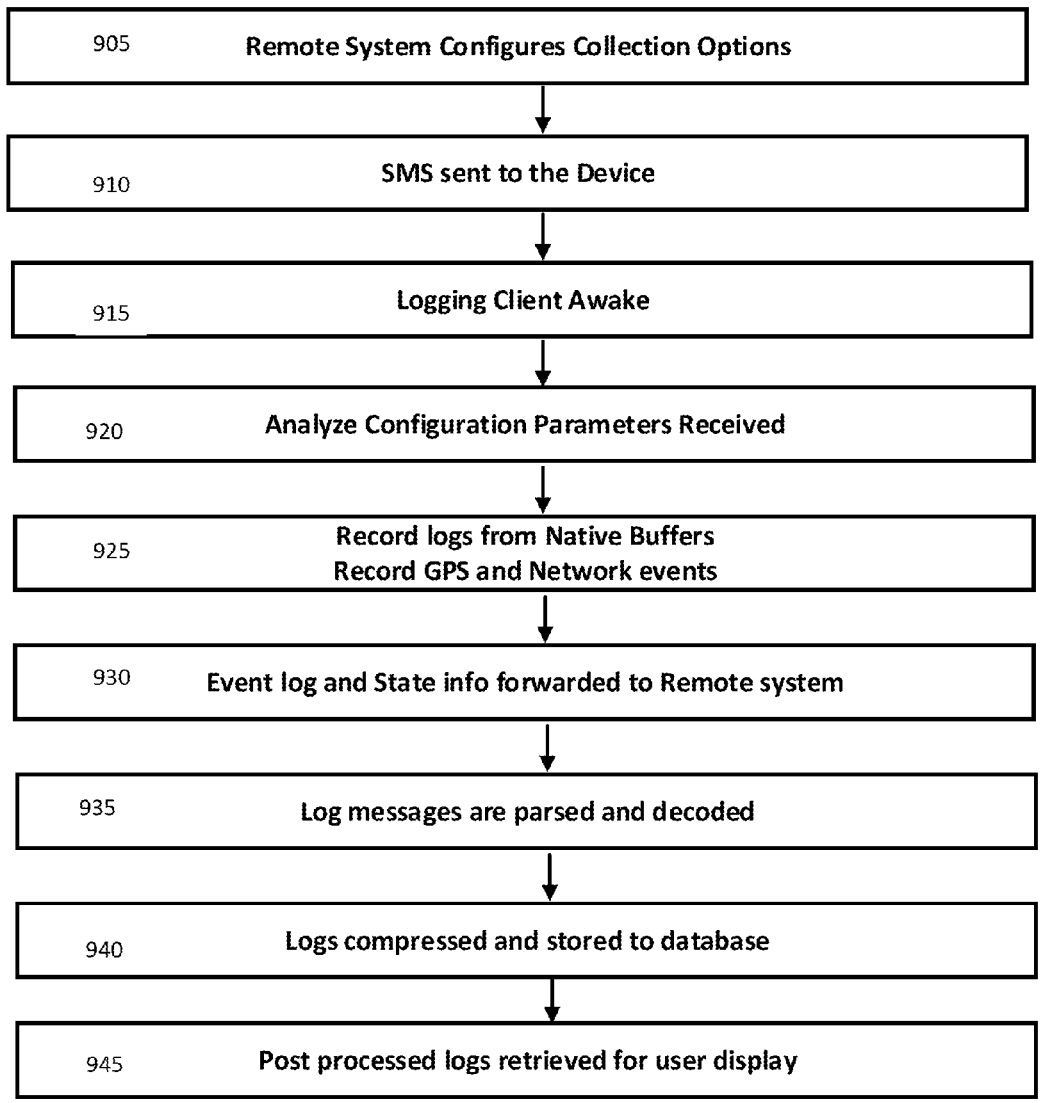
FIG. 9 shows an example high level end to end logging process call flow.

FIG. 9, along with FIG. 5, describes the high level end to end logging process. A Technician configures the collection options, as described herein above, on the remote system (905) and initiates the logging process. An SMS is sent to the device to wake up the device client 10 (910). Once the device client 10 is awake (915), it exchanges authentication information with the remote system. The configuration parameters received are then analyzed (920). The device client 10 begins recording logs from the native buffers and recording GPS and Network related events (925). The recorded event logs and state information is forwarded to the remote system (930). The remote system parses and decodes the log messages received (935). The logs are compressed and stored in the database (940). Post processed logs are then retrieved and displayed on the graphical user interface on the technician's console (945).

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

What is claimed is:

1. A method for collecting log information, comprising:
activating a wireless device using a short message system from a remote system;
receiving instructions from the remote system to record log information for the wireless device operating in at least a given environment and state, wherein the log information includes system buffer information, network information, event buffer information, radio buffer information and global positioning system information;
recording the log information in accordance with the instructions; and
sending recorded log information to the remote system for storage and analysis,
wherein the recorded log information is sent from a centralized buffer when a connection between the wireless device and the remote system is online and from a file after the connection is restored after a connection failure, and wherein the file contains the log information transferred from the buffer during the connection failure.

2. The method of claim 1, further comprising:
pulling a portion of the log information from the wireless device native buffers; and
recording changes in network and global positioning system information to generate another portion of the log information.

3. The method of claim 2, further comprising:
storing the log information in the centralized buffer in the wireless device for online logging and in the file system for offline logging.

4. The method of claim 3, further comprising:
generating a log post message from the stored log information.

5. The method of claim 1, further comprising:
providing analytic information with the log information.

6. The method of claim 1, further comprising:
notifying a remote technician in an event of a predetermined event on the wireless device.

7. The method of claim 1, wherein the connection between the wireless device and the remote system is a remote control session.

8. The method of claim 1, wherein a log retrieval time period is received from the remote system.

9. A method for analyzing log information, comprising:
transmitting an activation message to a wireless device and establishing a connection with the wireless device;
transmitting a logging command to the wireless device to record log information, wherein the log information includes system buffer information, network information, event buffer information, radio buffer information and global positioning system information;
receiving the log information from a buffer in the wireless device when the connection is online;
receiving the log information from a file that contains the log information that was transferred from the buffer during a connection failure, wherein reception of the log information resumes from the buffer when connection is back online;
processing the received log information;
storing the processed log information; and
displaying the processed log information.

10. The method of claim 9, further comprising:
analyzing processed log information based on analytic information associated with the log information.

11. The method of claim 10, wherein analysis is one of real-time and batch driven.

12. The method of claim 9, wherein the logging command includes at least logging start and stop times, log levels, log types, and markers.

13. A wireless device for collecting log information, comprising:
the wireless device configured to receive a short message system from a remote system;
a log message listener configured to receive instructions from the remote system to record log information for the wireless device operating in at least a given environment and state, wherein the log information includes system buffer information, network information, event buffer information, radio buffer information and global positioning system information;
a logging module configured to record the log information in accordance with the instructions; and
a log transporter configured to transmit the recorded log information to the remote system for storage and analysis,
wherein the log transporter is configured to transmit the recorded log information from a centralized buffer when a connection between the wireless device and the remote system is online and from a file after the connection is restored after a connection failure, and wherein the file contains the log information transferred from the buffer during the connection failure.

14. The wireless device of claim 13, further comprising:
the logger configured to store the log information in the centralized buffer in the wireless device for online logging and in the file system for offline logging.

15. The wireless device of claim 13, further comprising:
a log manager configured to generate a log post message from the stored log information.

16. The wireless device of claim 13, wherein analytic information is provided with the log information.

17. The wireless device of claim 13, further comprising:
a logger configured to pull a portion of the log information from the wireless device native buffers;
a location listener configured to track changes in global positioning system information; and
a phone state listener configured to track changes in network configuration.

18. A system for analyzing log information, comprising:
a logging tool configured to transmit an activation message to a wireless device;
the logging tool configured to transmit a logging command to the wireless device to record log information, wherein the log information includes system buffer information, network information, event buffer information, radio buffer information and global positioning system information;
the logging tool configured to receive the log information from a buffer in the wireless device when a connection is online;
the logging tool configured to receive the log information from a file that contains the log information that was transferred from the buffer during a connection failure after connection is restored and wherein reception of the log information resumes from the buffer when the connection is restored;
the logging tool configured to process the received log information;

the logging tool configured to store the processed log information; and the logging tool configured to display the processed log information.

19. The system of claim 18, wherein the processed log information is analyzed in real-time or is batch driven.

20. The system of claim 18, wherein the logging command includes at least logging start and stop times, log levels, log types, and markers.

21. The system of claim 18, wherein the log information includes analytic information associated with the log information.

* * * * *